United States Patent [19]

Bertling et al.

[11] Patent Number: 5,353,203
[45] Date of Patent: Oct. 4, 1994

[54] HEADLIGHT FOR A VEHICLE

[75] Inventors: Johannes-Gerhard Bertling, Vaihingen/Enz; Bodo Remus, Reutlingen; Klaus Jahnel, Stuttgart, all of Fed. Rep. of Germany

[73] Assignee: Robert Bosch GmbH, Stuttgart, Fed. Rep. of Germany

[21] Appl. No.: 124,407

[22] Filed: Sep. 20, 1993

[30] Foreign Application Priority Data

Nov. 13, 1992 [DE] Fed. Rep. of Germany ....... 4238274

[51] Int. Cl.$^5$ ............................................. B60Q 1/04
[52] U.S. Cl. ...................................... 362/61; 362/243; 362/247; 362/297
[58] Field of Search .................. 362/61, 80, 243, 245, 362/248, 297, 346, 293

[56] References Cited

U.S. PATENT DOCUMENTS

| | | | |
|---|---|---|---|
| 2,277,685 | 3/1942 | Bergström | 362/214 |
| 3,622,778 | 11/1971 | Cibie | 362/247 |
| 3,759,084 | 9/1973 | Plewka | 362/235 |
| 3,870,876 | 3/1975 | Puyplat | 362/247 |
| 4,587,601 | 5/1986 | Collins | 362/303 X |
| 4,924,359 | 5/1990 | Lindae et al. | 362/346 X |

*Primary Examiner*—Stephen F. Husar
*Attorney, Agent, or Firm*—Michael J. Striker

[57] ABSTRACT

The headlight has a one-piece reflector which includes an upper reflector portion with a light source for making a low beam, a lower reflector portion with another light source for making a fog light beam and a laterally positioned reflector portion for making a high beam. The lower reflector portion has a surface area which is comparatively small relative to the upper reflector portion. The light emitted from the other light source is reflected by the lower reflector portion in rays nearly parallel in a vertical longitudinal plane or inclined gently downward in the propagation direction. In the horizontal longitudinal plane light rays reflected from positions on the peak region of the lower reflector portion converge more as the distance of the position from the optic axis increases, light rays reflected from positions on the central region converge less as the distance of the position from the optic axis increases and light rays reflected from the edge region are nearly parallel. The lower reflector portion is shaped so that light emitted from the other light source is used effectively so that it requires only a comparatively small surface area and can be integrated in the reflector.

9 Claims, 2 Drawing Sheets

HEADLIGHT FOR A VEHICLE

BACKGROUND OF THE INVENTION

The present invention relates to a headlight for a vehicle, especially a motor vehicle.

A headlight for a vehicle is known comprising a reflector having an upper reflector portion with a first light source for production of a low beam and a lower reflector portion for production of an additional light beam and cover means, particularly a glass pane, for covering the light outlet opening of the headlight.

This type of headlight is described in U.S. Pat. No. 2,277,685. It has two reflectors placed above each other, each reflector being associated with its own light source. The reflector portion forming the upper part of the reflector is designed for production of a low beam and the reflector portion forming the lower reflector is designed for making a high beam, i.e. the so-called high beam light. The surface area available for the headlights in a vehicle is in general limited. In the known headlight the size of the high beam reflectors is limited, since as large as possible a portion of the available surface is required for the low beam reflector.

Fog lights, which are mounted as additional headlights independent of the high beam and/or low beam headlights, are also used in vehicles. In special weather conditions, for example fog, heavy rain or snow fall, the visibility of the driver is improved by the fog lights because of their special light distribution. The fog lights used as additional headlights means however additional manufacturing and assembly expenses, since these require special mounting means on the chassis of the motor vehicle and also often contribute to additional air resistance.

SUMMARY OF THE INVENTION

It is an object of the present invention to provide a headlight for a vehicle having a reflector portion for production of a fog light beam which is an integral part of the reflector used to make the low beam light and thus to provide the fog light with no additional expense or effort beyond that required to make the low beam light.

This object and others which will be made more apparent hereinafter are attained in a headlight for a vehicle comprising a reflector having an upper reflector portion with a light source for production of a low beam and a lower reflector portion with another light source for production of an additional light beam and cover means through which the light beams can pass for covering a light outlet opening of the headlight.

According to the invention, the lower reflector portion is formed so as to produce a fog light beam and both reflector portions are part of a single piece reflector. Because of this structure, no additional expense and effort is necessary to provide special fog lights with their own mounting means and possible adverse effect on air resistance during vehicle operation.

Various embodiments of the present invention are possible.

The lower reflector portion advantageously has a peak region, an edge region and a central region connecting the edge region and the peak region. The lower reflector portion can be formed so that light rays from the other light source are reflected so as to be scattered in a horizontal longitudinal plane but substantially parallel with an upper light-dark boundary in a vertical longitudinal plane. The peak region of the lower reflector portion reflects the light rays emitted from the other light source so that the light rays so reflected converge in the horizontal longitudinal plane and the light rays emitted by the other light source are reflected from positions on the central region and the edge region of the lower reflector portion so as to converge less as a distance of those positions from the optic axis increases. A lower reflector constructed in this way utilizes light intensively and produces an effective fog light beam. Because of that only a comparatively small surface area is required for making the fog light beam, which can be integrated in the low beam reflector portion. Without this type of structure the surface area available for the low beam light is too strongly reduced by the structure required for making the fog beam light. Furthermore the light emitted from the light source already is reflected so that the fog light beam arises and the cover means for the headlight, i.e. the cover glass or pane, does not need or needs only weak optical elements for changing the light passing through it.

In a preferred embodiment the reflector means also includes an additional reflector portion with an additional light source positioned laterally beside the upper and lower reflector portion. This additional reflector portion produces a high beam. The additional reflector portion, the upper reflector portion and the lower reflector portion are integrated in the one-piece reflector. This type of structure provides a considerable cost savings, however by separation of the three functions into the three separate reflector portions the reflector can perform each function in an optimum way. A comparatively large surface area is available for the light beam reflector so that a completely effective high beam can be produced.

BRIEF DESCRIPTION OF THE DRAWING

The objects, features and advantages of the present invention will now be illustrated in more detail by the following detailed description, reference being made to the accompanying drawing in which.

DESCRIPTION OF THE PREFERRED EMBODIMENTS

Figure 1:
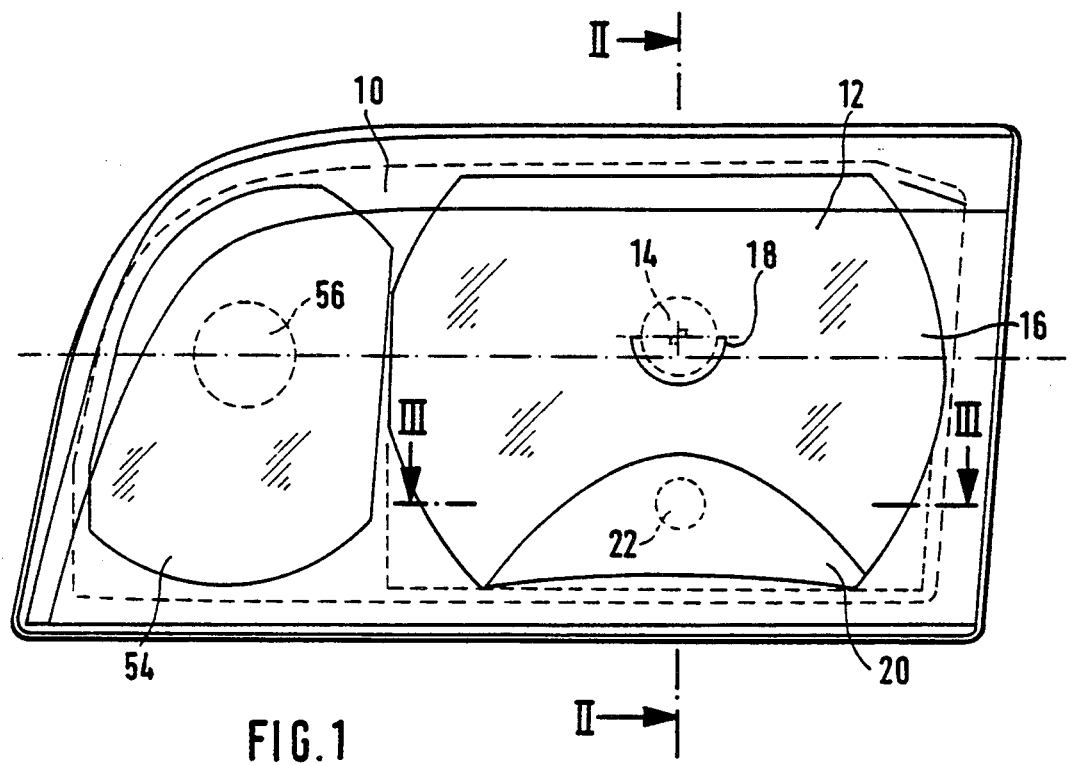
FIG. 1 is a schematic front view of a headlight according to the invention.

A headlight shown in FIG. 1 for a vehicle, especially a motor vehicle, has a reflector 10, which has an upper reflector portion 12 on the vehicle exterior, in which a light source 14 is mounted. The light source 14 can be an incandescent lamp or a gas discharge lamp. The light outlet opening of the headlight is covered with cover means 16, e.g. a glass panel or pane through which the light beams can pass. The upper reflector portion 12 is thus designed so that the light issuing from the light source 14 is reflected by it to form a low beam. The upper reflector portion 12 can have a predomanently parabolic shape and is provided with a beam aperture or stop by which the required light-dark boundary of the low beam is produced. Also optical elements are required in the cover means 16, by which the light reflected from the upper reflector portion 12 is guided and/or controlled to form the low beam. The upper reflector portion 12 is however advantageously formed so that light emitted from the light source is already reflected by it so that the low beam is produced with the required light distribution and with the required light-dark boundary.

Under the upper reflector portion 12 the reflector 10 has a lower reflector portion 20, in which another light source 22 is mounted and which has an optic axis 23. The light source 22 can also be an incandescent lamp or a gas discharge lamp. The lower reflector portion 20 has a substantially smaller surface than the upper reflector portion 12, is used to make a fog light beam and is formed so that the light emitted from the other light source 22 is scattered horizontally by it. A step 21 is formed at a discontinuity between the upper reflector portion 12 and the lower reflector portion 20. The discontinuity can extend in a horizontal plane in another embodiment or, as shown in the embodiment of FIG. 1, can be curved so that the lower reflector portion has its greatest vertical extent or height from the lower edge of the reflector in a middle portion and its height is least in a direction towards the lateral edges of the reflector. The lower reflector region or portion 20 appears from the front, as shown in FIG. 1, to be shaped lake an inverted or up-side-down "U". The upper reflector portion 12 can reach to the lower edge of the reflector at its lateral edges.

Figure 2:
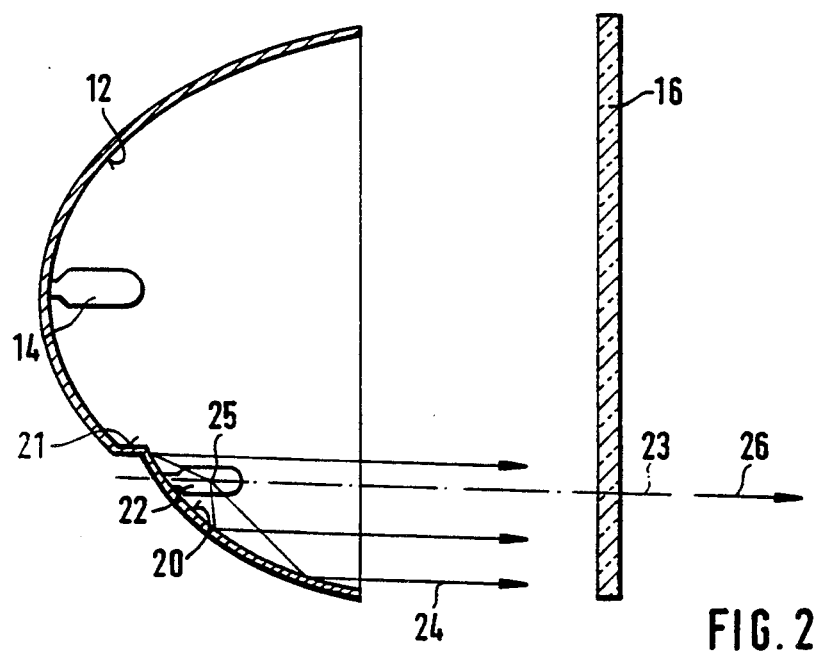
FIG. 2 is a schematic cross-sectional view of the headlight of FIG. 1 taken along the section line II—II in FIG. 1.
Figure 3:
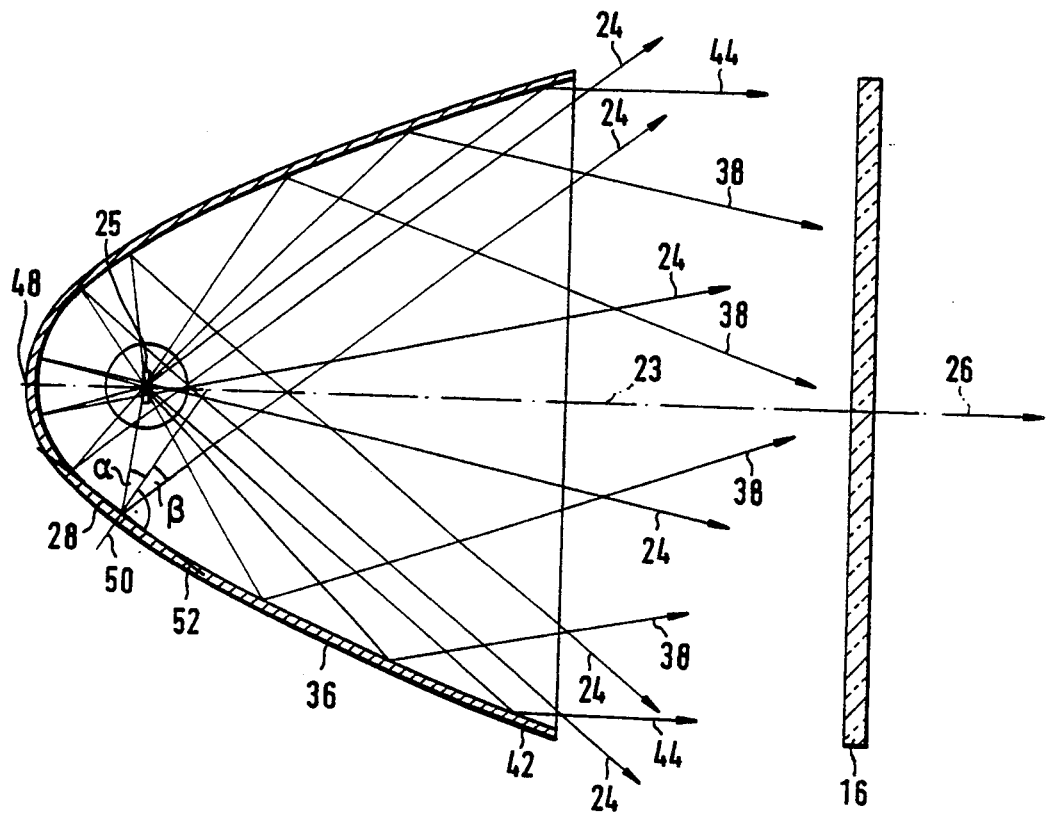
FIG. 3 is a schematic cross-sectional view of the headlight of FIG. 1 taken along the section line III—III of FIG. 1.
Figure 4:
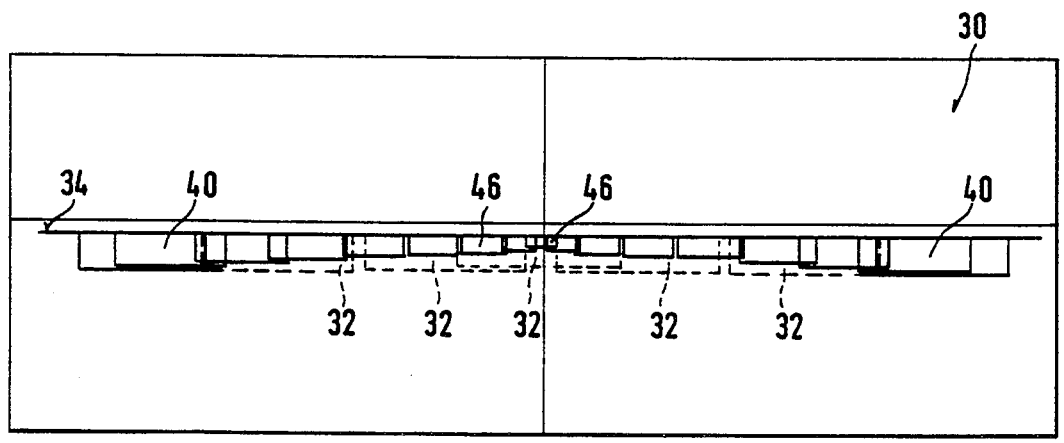
FIG. 4 is an image of a light source reflected from a reflector according to the invention on a measuring screen.

The light issuing from the other light source 22 is reflected from the lower reflector portion 20 in a vertical longitudinal plane as a substantially parallel light beam. The rays 24 of the light beam travel in the vertical longitudinal plane, as shown in FIG. 2, in substantially parallel and horizontal directions or are gently inclined downwardly. The light source 22 has a light emitting body 25 extending transversely to optic axis 23. A light source extending substantially parallel to the optic axis 23 can also be used. The peak region 28 of the lower reflector portion 20 is designed so that converging light rays are reflected, as shown in FIG. 3, in the horizontal longitudinal plane because of this structure of the other light source 22. The light rays 24 coverge toward the optic axis 23, the light rays 24 impinging on positions further from the optic axis 23 converging more than those closer to the optic axis 23, so that the light rays 24 cross the optic axis 23. FIG. 4 shows the image of the other light source 22 reflected by the lower reflector portion 20 on measuring screen 30 in its lateral edge regions. The light rays 24 reflected by the reflector part to the right of the optic axis 23 illuminate the measuring screen 30 on the left side of the optic axis 23 and vice versa. The images 32 of the other light source 22 reflected from the peak region 28 are large because of the proximity of the other light source to the peak region 28, which are positioned horizontally along a light-dark boundary 34. The images 32 migrate from the center of the measuring screen 30 to its edges and their size decreases with increasing distance of the positions from which they are reflected on the reflector reflecting them from the optic axis 23.

The lower reflector portion 20 connected to the peak region 28 is formed in a central region 36 so that the reflected light rays 38 are less strongly convergent in this region with increasing distance of the positions from which they are reflected from the optic axis 23 in the horizontal longitudinal plane. Like the light rays 24 of the peak region 28 the light rays 38 travel substantially parallel and horizontal or gently inclined downwardly in the light propogation direction 26. The inclination of these light rays 38 to the optic axis 23 decreases with increasing distance of the positions from which they are reflected from the optic axis 23. The images 40 of the other light source 22 reflected from the central region 36 shift from the edge of the measuring screen 30 to its center and are increasingly smaller with increasing distance from the optic axis 23.

The lower reflector portion 20 is formed in its end or edge region 42 so that light rays 44 reflected from this region travel approximately parallel to each other both in the horizontal and vertical longitudinal planes. Because of that small images 46 are reflected into the center of the measuring screen 30. These small images 46 can be used to obtain higher illumination strength under the light-dark boundary 34 in the vicinity of the optic axis 23. In an alternative embodiment the edge region 42 also is formed so that these light rays 44 are diverging in a horizontal longitudinal plane and travel approximately parallel to each other in a vertical longitudinal plane. With this latter type of edge region 42 a uniform and particularly bright illumination is attained in the vicinity of the optic axis 23 in contrast to the situation in which the light rays travel substantially parallel in a horizontal longitudinal plane.

The transition between the peak region 28, the central region 36 and the edge region 42 of the lower reflector portion 20 is continuous, without step or discontinuity, so that a comparatively simple method can be used to make the reflector. Furthermore it is guaranteed that no interruption or discontinuity occurs in the light beam reflected from the lower reflector portion 20, which could originate from discontinuities in the shape of the reflector.

The comparatively large images 32 of the other light source 22 reflected from the peak region 28 of the lower reflector portion 20 form a light band with larger vertical extent, but comparatively reduced brightness. The comparatively smaller images 40 of the light source 22 reflected from the central portion 36 form a horizontal light band located horizontally under and close to the light-dark boundary 34. This light band has a smaller vertical extent relative to the light band reflected from the peak region 28. Smaller images 46 of the light source 22 are reflected into the center region of the measuring screen 30 from the edge region 42, which provide a comparatively high intensity immediately under the light-dark boundary 34. With the above described structure of the lower reflector region 20 also an effective fog light beam can be produced with a small surface area of the reflector region 20. Because of the small required surface area of the lower reflector part or portion 20 this can be satisfactorily integrated into a low beam in a low beam headlight, since the surface area available for producing the low beam light is only reduced comparatively little by it. The division of the available surface of the reflector 10 between the means for producing low beam light and means for making the fog light must be directed according to the need to produce a completely effective fog light and to obtain a completely effective low beam light.

The first consideration in the design of the lower reflector 20 is the desired light distribution on the measuring screen 30 just as it is in the case of the upper reflector portion 12. The light distribution gives the light intensity values in different regions of the measuring screen 30. The light intensity values are determined by the images of the other light source 22 reflected in the respective regions of the measuring screen 30. Based on the images of the other light source required for obtaining the predetermined light intensity values in the different regions of the measuring screen 30 the required reflector form can be determiend by the laws of reflections. At the beginning of the calculation of the reflector shape the spacing of the peak 48 of the reflector region 20 from the other light source 22 is determined. The reflector shape is computed stepwise from the peak 48, since for each position on the reflector 20 as one moves from the peak 48 from the law of reflection the angle of incidence of the light beam reflected from that position on the reflector and relative to a normal 50 of the reflector to the position of the image of the other light source 22 to be reflected by it equals the angle of reflection. This law can therefore be used to determine the orientation of the normal 50 for the particular region of the reflector being calculated. From the orientation of the normal to the surface at that point the tangential plane perpendicualr to it can be determined for that region of the reflector. By successively determining the the orientiatio of the neighboring reflector regions in a stepwise manner a continuous reflection shape without steps and discontinuities is generated by the calculation. The design of the upper reflector portion 12 producing the low beam light can occur in the same manner as the design of the lower reflector portion 20. However the light distribution for the upper reflector portion 12 must differ from that for the lower reflector portion 20 in regard to the course of the light-dark boundary and the light intensities.

The reflector 10 can also have an additional reflector portion 54, which is located beside the upper and lower reflector portions 12, 20 and which produces high beam light. A suitable light source 56 is arranged in the additional reflector portion 54. The reflector portion 54 can be parabolic so that the cover means 16 is provided in its region covering the reflector portion 54 with optical elements for making the high beam from the light reflected from the reflector portion 54. Advantageously the reflector portion 54 is designed so that the light from the light source 56 reflected by it is already in a light distirbution suitable from a high beam. The design of the reflector portion 54 can occur in the same manner as described above for the reflector portion 20.

The reflector 10 is advantageously made from plastic and is made for example by injection molding, but can however also be made from metal. Because of the one-piece structure of the reflector 10 all the reflector portions 12, 20 and 54 can be adjusted simultaneously.

While the invention has been illustrated and described as embodied in a headlight for a vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. Headlight for a vehicle, said headlight comprising reflector means including an upper reflector portion associated with a light source for making a low beam and a lower reflector portion associated with another light source from making a fog light beam; and cover means through which said light beams pass, wherein said reflector means includes both said upper and lower reflector portions and is formed as one-piece.

2. Headlight as defined in claim 1, wherein said other light beam comprises a plurality of light rays, said light rays being propogated so as to be scattered in a horizontal longitudinal plane but substantially parallel with an upper light-dark boundary in a vertical longitudinal plane, the lower reflector portion having an optic axis, a peak region, a central region and an edge region, said peak region of said lower reflector portion reflecting said light rays emitted from said other light source so that said light rays so reflected converge in said horizontal longitudinal plane and said light rays emitted by said other light source are reflected from positions on said central region and said edge region of said lower reflector portion so as to converge less as a distance of said positions from said optic axis increases.

3. Headlight as defined in claim 2, wherein said edge region of said lower reflector portion reflects said light rays emitted from said other light source so as to be substantially parallel to each other in said horizontal longitudinal plane.

4. Headlight as defined in claim 2, wherein said edge region of said lower reflector portion reflects said light rays emitted from said other light source so as to be substantially diverge from each other in said horizontal longitudinal plane.

5. Headlight as defined in claim 2, wherein said edge region of said lower reflector portion is formed so that said light rays emitted by said other light source are reflected from positions on said peak region of said lower reflector portion so as to converge more as a distance of said positions from said optic axis increases.

6. Headlight as defined in claim 5, wherein a convergence of said light rays reflected by said positions on said peak region increases more at positions on said peak region near said optic axis than at positions on said peak region further than said positions near said optic axis.

7. Headlight as defined in claim 6, wherein said convergence of said light rays reflected from said positions on said peak region further than said positions remains constant.

8. Headlight as defined in claim 2, wherein said peak region of said lower reflector portion is formed so that comparatively larger images of said other light source are reflected by said peak region in a light band extending under a light-dark boundary and said central region and said peak region are formed so that other comparatively smaller images of said light source are reflected into a central part of a light distribution.

9. Headlight as defined in claim 1, wherein said reflector means also includes an additional reflector portion with an additional light source positioned laterally beside said upper and lower reflector portion, said additional reflector portion producing a high beam; said additional reflector portion, said upper reflector portion and said lower reflector portion being part of said one-piece.

* * * * *